United States Patent [19]

Chauve

[11] 4,351,422
[45] Sep. 28, 1982

[54] INDUSTRIAL DISC BRAKE
[75] Inventor: Jean Chauve, Nevers, France
[73] Assignee: Societe Anonyme Francaise du Ferodo, Paris, France
[21] Appl. No.: 143,558
[22] Filed: Apr. 25, 1980
[30] Foreign Application Priority Data
Apr. 26, 1979 [FR] France ............... 79 10592
[51] Int. Cl.³ ............................................. F16F 65/20
[52] U.S. Cl. ................................. 188/170; 188/72.4
[58] Field of Search ............. 188/72.1, 72.3, 72.4, 188/170, 366–370

[56] References Cited
U.S. PATENT DOCUMENTS
3,008,546 11/1961 Erickson .............. 188/72.3 X
3,417,843 12/1968 Trollope .................. 188/170

FOREIGN PATENT DOCUMENTS
1155820 6/1969 United Kingdom ............ 188/72 X

Primary Examiner—Duane A. Reger
Attorney, Agent, or Firm—Charles E. Brown

[57] ABSTRACT

An industrial disc brake is disclosed having a fixed support with a bore facing a brake disc in which a brake shoe is axially slidably mounted for displacement toward the brake disc in response to the force exerted by a stack of Belleville washers and away from the brake disc in response to a hydraulic actuating unit. Swivel contact is provided between the brake shoe and the fixed support. Swivel contact is also provided between the actuating unit and the fixed support. The actuating unit is in simple axial bearing contact through its fixed member or cylinder with the fixed support.

15 Claims, 4 Drawing Figures

U.S. Patent    Sep. 28, 1982    4,351,422
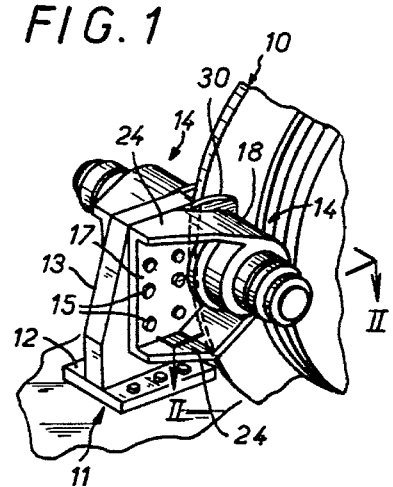
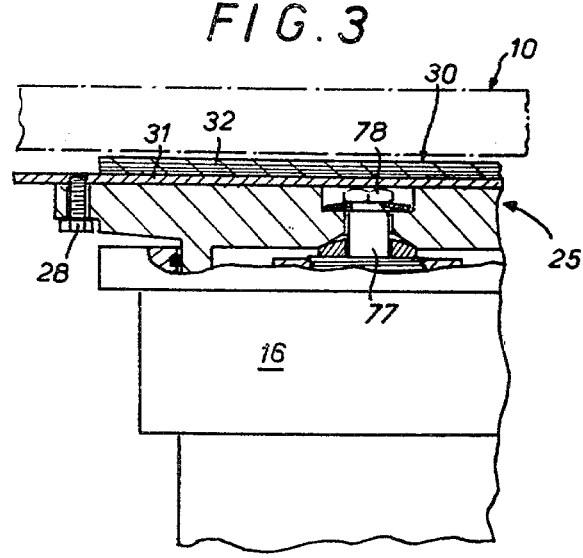
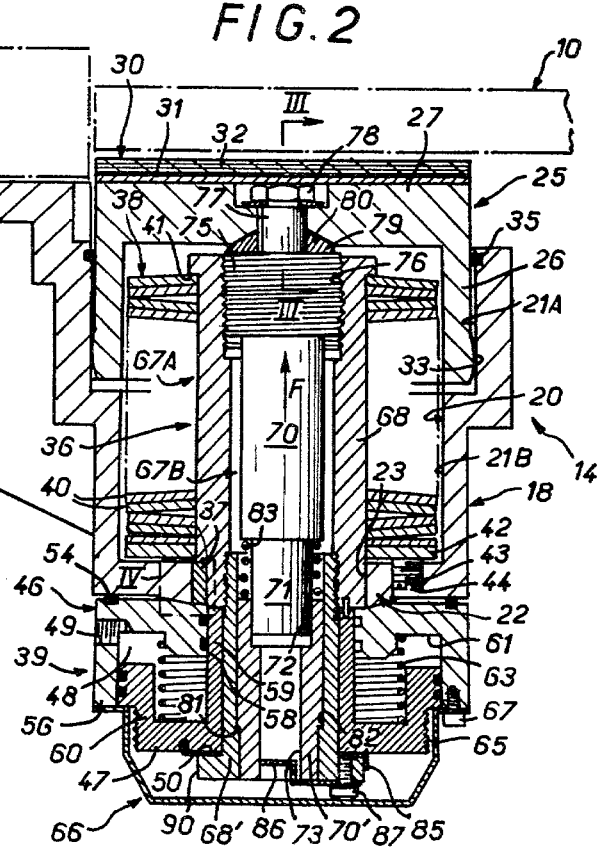
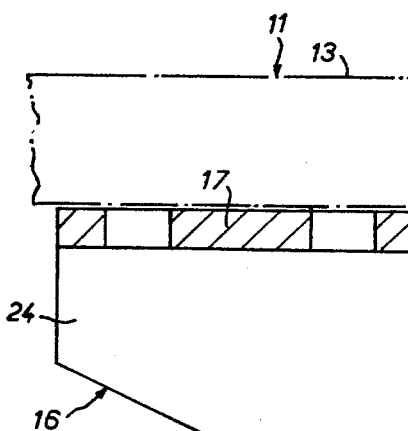

1

INDUSTRIAL DISC BRAKE

FIELD OF THE INVENTION

The present invention relates generally to disc brakes of the type comprising, in association with a brake disc, a fixed support having a bore facing the disc with its axis generally perpendicular thereto and a brake shoe slidably mounted in the bore axially displaceable in a first direction toward the disc by resilient control means bearing against the fixed support and in a second, opposed direction by an actuating unit carried by the fixed support.

BACKGROUND OF THE INVENTION

Such disc brakes which in practice are mounted in pairs on either side of the brake disc define safety brakes. The actuating unit which may be hydraulically or magnetically operated normally holds the brake shoe out of contact with the brake disc and when necessary the motive power of the actuating unit is cut off and the resilient control means which also effectively acts on the brake shoe positively urges the brake shoe against the brake disc.

Such brakes are therefore typically used for industrial purposes, for example for travelling cranes, winches, drums and conveyors, such as disclosed in French Pat. No. 1,412,483.

One of the problems to be overcome with brakes of this type resides in the circumferential drag forces imparted to the brake shoe owing to its contact with the brake disc. This circumferential force must be withstood by the fixed support and therefore transmitted to the fixed support by the brake shoe while the brake shod admits of axial displacement so it is maintained against the brake disc even when the friction facing is worn.

Heretofore the contact surfaces between the brake shoe and the fixed support have both been cylindrical which is the case in particular with the above mentioned French patent.

Because of the circumferential drag force imparted to the brake shoe it has the tendency to move out of alignment with the axis of the bore in which it is slidably mounted so that with the corresponding surfaces being cylindrical there is always somewhat of a likelihood of brake shoe becoming jammed in the bore which obviously jeopardizes axial displacement of the brake shoe.

Further considerable stresses which are liable to damage the contact surfaces then develop between the brake shoe the fixed support in line with the corresponding contact surfaces.

These risks of jamming and damages are all the greater as the vibration, however small they may be, often add to the circumferential force. The brake shoe is inevitably subjected to such vibrations owing the possible defects in the geometrical configuration of the brake disc with which it is in contact.

SUMMARY OF THE INVENTION

An object of the present invention is a disc brake of the above type in which, according to a first aspect, means are employed for overcoming the aforesaid drawbacks.

According to the invention there is provided a disc brake comprising, in association with a brake disc, a fixed support having a bore facing the brake disc with its axis perpendicular thereto, a brake shoe axially displaceable in said bore in a first direction relative to the brake disc in response to resilient control means bearing against said fixed support, and in a second direction opposite to the first direction in response to an actuating unit carried by said fixed support. The improvement comprises swivel contact means between said brake shoe and said fixed support.

In practice the swivel contact means comprises a toroidal contact surface, for example, with a circular meridian, provided on one of the brake shoe and fixed support for contact with the other of the brake shoe and fixed support.

Thanks to such swivel contact means the transmission of the circumferential drag force imparted to the brake shoe may occur without developing stresses between the brake shoe and the fixed support and without the risk of jamming the brake shoe, whatever are the small vibrations that may also be imparted to the brake shoe due to possible defects in the geometrical configuration of the brake shoe.

According to another aspect of the invention, the actuating unit which comprises a fixed member defining a cylinder and a movable member defining a piston which is attached by a rod to the brake shoe, is in simple axial bearing contact through the fixed member against the fixed support and swivel contact means are provided between it and the fixed support.

This arrangement has a dual advantage. First of all, it provides automatic compensation for any possible misalignment of the rod to which the brake shoe is attached in relation to the fixed support due to any possible defect in the position of the brake shoe with respect to the brake disc on assembly and for circumferential drag which is imparted to the brake shoe in the course of its operating life and thereby it also helps prevent the development of stresses in line with the contact surfaces between the actuating unit and the fixed support.

Furthermore, since the actuating unit bears axially against a contact surface of revolution of which at least one is toroidal, which is a characteristic of the swivel contact means employed, the actuating unit is advantageously free to swivel about the axis of the bore in the fixed support.

Consequently, on assembly, it is possible, irrespective of the actual location of the brake shoe relative to the brake disc, to orient the actuating unit in any position appropriate for its operation. For instance, with a hydraulic actuating unit it is then possible to orient it in a position in which the drain valve of the actuating unit is properly situated.

The manufacture of the brake and its assembly are thus facilitated.

According to a preferred embodiment in which the actuating unit is a hydraulic actuating unit comprising a pressure chamber through which a rod attached to the movable member of the actuating unit and the brake shoe extends axially, the rod being fixed beyond the movable member by a transverse shoulder by which it bears axially against the movable member, the hydraulic actuating unit according to the preferred aspect of the invention defines a fluidtight entity, its pressure chamber being entirely confined between the fixed member and the movable member.

Owing to the fact that the actuating unit itself thus forms an independent fluidtight unit it is advantageously possible, according to the invention, to disassemble the brake in situ, even in a very dusty environment without the risk of the ingress of dirt into the pressure chamber of the actuating unit.

According to an aspect of the invention such disassembly is made easier by the fact that the rod to which the brake shoe is attached is formed in two axial parts, namely a first or forward part attached to the brake shoe and a second or rear part having transverse shoulder by which the rod bears axially against the movable member of the actuating unit, the first and second parts being axially connected to each other by disengageable coupling means, e.g. threaded means.

To have access to and remove the actuating unit it is then sufficient to withdraw the rear part of the rod which attaches the movable member of the actuating unit to the brake shoe.

These and other features and their advantages will be brought out in the description which follows, given by way of example, with reference to the accompanying diagrammatic drawing.

BRIEF DESCRIPTION OF THE DRAWINGS

FIG. 1 is a perspective view of a disc brake embodying the invention, illustrating its position;

FIG. 2 is a longitudinal section view, on a larger scale, of the disc brake taken along line II—II in FIG. 1;

FIG. 3 is a fragmentary sectional view taken on line III—III in FIG. 2 and a fragmentary elevational view of the disc brake embodying the invention; and FIG. 4 is a view, on a larger scale, of the inset IV in FIG. 2.

DETAILED DESCRIPTION OF THE PREFERRED EMBODIMENT

In FIG. 1 the rotatable brake disc which is designated by general reference numeral 10 is only partially shown. The disc is of the industrial type for equipping, for example, certain hoists, drums, traveling cranes and conveyors.

The disc 10 is only schematically represented by phantom lines in FIGS. 2 and 3 and need not be described in greater detail here.

In line with the edge of the disc 10 is a mounting member 11 of generally T-shaped configuration including a base 12 and a central web 13 perpendicular to the base 12 carrying two brake units 14 respectively disposed on opposite sides of the central web 13 and suitably secured thereon by means of screws. A plurality of pairs of such brake units 14 may of course be associated with the same brake disc along at least part of its periphery.

According to the invention such a brake 14 comprises a fixed support 16, called a stirrup, formed by a flange 17 by which it is adapted to be secured to the central web 13 of the fixed mounting member 11 and a cylindrical body 18 protruding from the flange 17 having, facing the disc 10, a bore of revolution 20 opening toward the disc and an axis generally perpendicular to the disc.

In the illustrated embodiment the bore 20 has two successive axial sections, namely, a forward section 21A relatively adjacent the disc 10 and a rear section 21B radially stepped in relation to the forward section 21A. As shown, the sections 21A and 21B of the bore 20 are both cylindrical and circular in cross section.

The cylindrical body 18 has an end wall 22 axially remote from the disc 10 with an axial opening 23 therein.

On its exterior the cylindrical body 18 is connected to the flange 17 by two reinforcing ribs 24.

Inside the bore 20 of the cylindrical body 18, and more particularly inside the forward section 21A, a brake shoe 25 is slidably mounted. The brake shoe comprises a generally cylindrical skirt 26 which is nested inside the forward section 21A of the bore 20 and an end wall 27 on the outer face of which facing the disc 10 is secured a brake pad 30 by screws 28 (see FIG. 3), which brake pad is formed in the usual manner by a support plate 31 and a friction facing 32.

According to the invention swivel means are provided in contact with the brake shoe 25 and the fixed support 16. In actual practice as shown in the illustrated embodiment the forward section 21A of the bore 20 is cylindrical and the swivel contact means comprise a toroidal contact surface 33 at the end and along the outer face of the skirt 26 on the brake shoe 25 for contact with the forward section 21A of the bore 20. The meridian curve of such a toroidal surface may, for example, be circular.

Alternatively, the toroidal contact surface may also be formed as a protrusion on the forward section 21A of the bore 20 for contact with the skirt 26 on the brake shoe 25 in which case the outer face may be cylindrical.

According to another modification, complementary toroidal contact surfaces are provided on the brake shoe 25 and the forward section 21A of the bore 20 of the cylindrical body 189.

In any event, in the illustrated embodiment the assembly is completed by a sealing member 35 provided between the brake shoe 25 and the cylindrical body 18 adjacent the open end of the forward section 21A to preclude any ingress of dirt into the bore 20. Alternatively, the sealing member may be replaced by a bellows.

For controlling the brake shoe 25 it is attached axially to a rod 36. Control rod 36 extends outside the cylindrical body 18 through the opening in the end wall 22 thereof and the opening 23, a key 37 locks the cylindrical body 18 for rotation. Alternatively, instead of such a key any other means for securing for rotation may be used, e.g., a set screw.

The brake shoe 25 is urged through the control rod 36 for axial displacement in a first direction, in practice toward the disc 10, by means of resilient control means 38 inside the cylindrical body 18 and in a second or opposite direction by an actuating unit 39 outside the cylindrical body 18.

In the illustrated embodiment the resilient control means 38 are formed by a stack of Belleville washers 40 arranged in pairs, which bears against a shoulder 41 on the control rod 36 adjacent the end thereof close to the brake shoe 25 and a bearing washer 42 adjustable by screw 43 threaded engaged in tapped hole 44 in the end wall 22 of the cylindrical body 18.

In the illustrated embodiment the actuating unit 39 is a hydraulic actuating unit which is situated annularly about the end of the control rod 36 remote from the disc 10, comprises a fixed member 46 defining a cylinder and a movable member 47 defining a piston, the fixed member 46 and the movable member 47 together defining a pressure chamber 48 adapted to be connected through an orifice 49 to a source of pressurized fluid (not shown).

The actuating unit 39, according to an aspect of the invention, is in simple axial bearing contact through its fixed member 46 against the fixed support 16, and more particularly against the end wall 22 of the cylindrical body 18 formed by the fixed support 16. In conjunction therewith the control rod 36 comprises, beyond the actuating unit 39, a transverse shoulder 50 through which it bears axially against the movable member 47 of the actuating unit.

Moreover, according to this aspect of the invention, other swivel contact means are provided for contact between the actuating unit 39 and the fixed support 16. In the illustrated embodiment, as best viewed in FIG. 4, the other swivel contact means comprise two complementary torodial surfaces 52 and 53 which are formed respectively on the fixed member 46 of the actuating unit 39 and the end wall 22 of the cylindrical body 18 for mutual contact of these two parts.

But, as above, only one of the parts may be provided with a toroidal contact surface, the other part having, for example, a plane or conical contact surface.

In any event, as illustrated, the assembly is completed preferably by a sealing member 54 or a bellows located between the actuating unit 39 and the cylindrical body 18 to prevent the ingress of any dirt between the parts concerned.

According to a further aspect of the invention, despite the fact that the control rod 36 extends through the hydraulic actuating unit 39, the hydraulic actuating unit forms a fluidtight entity, its pressure chamber 48 being entirely confined between its fixed member 46 and its movable member 47.

Indeed, the fixed member 46 comprises at its outer periphery a skirt 56 in which the movable member 47 is slidingly and sealingly received and at its inner periphery bore in which the movable member 47 is also slidingly and sealingly mounted, the movable member 47 itself having at its inner periphery a skirt 59 around the control rod 36. For cooperation with the skirt 56 of the fixed member the movable member 47 also has a skirt 60 in the illustrated embodiment.

By means of their skirts 56 and 60 the fixed member 46 and the movable member 47 are in cylinder-and-piston relation.

According to a further aspect of the invention, for reasons which will be understood hereinafter, the fixed member 46 has at the lower end of its skirt inside the pressure chamber 48, an annular groove 61 facing the edge of the corresponding skirt 60 of the movable member 47.

For reasons which will be understood hereinafter, the outer surface of the movable member 47 of the actuating unit 39 has an annular threaded surface 65.

Finally, a cap 66 is secured by screw 67 on the fixed member 46 of the actuating unit 39 for protecting the movable member 47 of the actuating unit and the corresponding free end of the control rod 36.

According to yet another aspect of the invention, also for reasons which will be brought out below, the control rod 36 is formed as two elements, namely an outer element 67A and a radially inner element 67B disposed coaxially inside the outer element.

The outer element 67A is in turn divided into a first or forward part 68 having a transverse shoulder 41 against which bears the stack of Belleville washers 40 and which is attached to the braking shoe 25 through the inner element member 67B, and a second or rear part 68' having a transverse shoulder 50 against which the control rod 36 bears axially against the movable member 47 of the actuating unit 39.

Parts 68 and 68' are axially connected to each other by means of disengageable coupling means. In the illustrated embodiment the last-mentioned means comprise threaded means: the inner bore of the forward part 68 is tapped while the corresponding end of the rear part 68' is threaded for engagement with the tapped bore.

The inner element 67B of the control rod 36 is also in turn divided axially into two parts, i.e., a forward part 70 and a rear part 70' which parts 70 and 70' are fixed for rotation with each other. In the illustrated embodiment the forward part 70 of the inner element 67B has a polygonal cross section 71 received in a complementary socket 72 in the rear part 70' of the inner element 67B of the control rod 36.

The rear part 70' is tubular, its socket 72 is extended by a bore 73 which opens to the surroundings at the distal end of the control rod 36 and which is of polygonal cross section, e.g., square.

The forward part 70 of the inner element 67B meshes by threaded means with the forward part 68 of the outer element 67A. For example, as illustrated in the drawing, the forward part 70 comprises a threaded section 75 and the corresponding end of the forward part 68 has a tapped bore 76, the threaded section 75 being in threaded engagement with the tabbed bore 76.

Further, the forward part 70 of the inner element 67B attaches the control rod 36 to the brake shoe 25. For this purpose the forward part 70 terminates by a section 77 which extends through the brake shoe 25 and is threaded beyond the brake shoe for threaded engagement with a nut 78.

Preferably as shown, swivel contact means are interposed between the forward part 70 of the control rod 36 and the brake shoe. To this end, in the illustrated embodiment, a washer 79 with a toroidal outer surface is inserted between the threaded section 75 of the forward part 70 of the control rod 36 and the end wall 27 of the brake shoe 25. The end wall 27 has around the threaded section 75 of the forward part 70 a toroidal surface of revolution 80 in contact with the toroidal outer surface of the washer 79.

By means of a shoulder 81 on the rear part 70' of the inner element 67B the rear part bears against a complementary shoulder provided on the rear part 68' of the associated outer element 67A. A coil spring 83 inserted between the forward part 70 and the rear part 70' insures contact of these shoulders with each other.

A tabbed washer 85 is interposed between the rear part 68' of the outer element 67A of the control rod 36 and the movable member 47 of the actuating unit 39; likewise a tabbed washer 86 fixed by a screw 87 to the rear part 68' is received in the bore 73 of the rear member 70' of the control rod 36.

As the reader will have already understood, there results a swivel mounting of the actuating unit 39 on the fixed support 16 whereby the actuating unit is freely swivelable about the axis of the cylindrical body 18 of the fixed support 16. Consequently, on assembly, it is easy to provide the right orientation for the desired location of drain valve (not shown) such actuating units are typically provided with.

After the actuating unit 39 is connected to a source of pressurized fluid, it is fixed against rotation by the corresponding supply tube (not shown).

In operation the brake shoe 25 is normally held out of contact with the disc 10 by the actuating unit 39, as shown in the drawing, pressurized fluid being permanently supplied to the actuating unit for this purpose. Whenever necessary the pressurized fluid in the actuating unit 39 is cut off and the actuating unit is connected to the discharge vessel. Urged by the stack of Belleville washers 40 the control rod 36 to which the brake shoe 25 is attached is displaced toward the brake disc 10, in the direction of arrow F in FIG. 2, the stack of Belleville washers then applies the brake shoe 25 against the brake disc 10.

Such is also the case when there is a failure in the hydraulic circuit supplying the actuating unit 39.

During braking the swivel contact means between the brake shoe 25 and the control rod 36 contribute to good application of the brake shoe against the brake disc 10.

In conjunction therewith the swivel contact means between the brake shoe 25 and the fixed support 16 allow transmission of the circumferential drag force imparted to the brake shoe 25 by the brake disc 10, without developing stresses at the corresponding contact surfaces.

Moreover, the swivel contact means provided between the actuating unit 39 and the fixed support 16 overcome the consequences of misalignment of the control rod 36 in relation to the brake disc 10, owing to imperfect positioning of the fixed support 16 relative to the brake disc 10.

Whenever necessary the brake may be released mechanically by removing the protective cap 66 and the brake pad 86, and then by loosening the inner element 67B of the control rod 36, a tool for imparting rotational movement being inserted for this reason into the bore 73 in the rear part 70' of the inner element 67B.

A similar operation is performed on assembly for adjusting the initial position of the brake shoe 25.

This is likewise the case when dismounting the brake pad 30 for displacement after the friction facing 32 has become worn.

If the brake shoe 25 must be held mechanically out of contact with the brake disc 10, a nut (not shown) is screwed on the threaded annular surface or neck 65 on the movable member 47 of the actuating unit 39. By bearing against the fixed member 46 of the actuating unit 39 axial displacement of the movable member 46 opposite to that indicated by the arrow F in FIG. 2 is produced, and thereby a corresponding displacement of brake shoe 25 by the control rod 36.

If the actuating unit 39 must be removed, it suffices to separate the rear part 68' of the outer element 67A from the forward part 68 of outer element 67A of the control rod 36 by unscrewing. For this purpose the outer rim 90 of the rear part 68' is preferably a polygonal contour and thus forms a nut.

During the removal of the rear part 68' of the outer element 67B, the rear part 70' of the inner element 67B of the control rod 36 which is advantageously removable relative to the forward part 70 with which it is associated, is also removed, thereby limiting the rear axial clearance necessary for the actuating unit 39 for disengaging it from the control rod.

This fact coupled with the telescopic engagement of the movable member 47 of the actuating unit 39 in relation to the fixed member 46 of the actuating unit due to the groove 61 provided in the fixed member 46 advantageously contributes to the accommodation of a maximum number of Belleville washers 40 in the brake for a given axial dimension and environment, and therefore produces maximum efficacy and holding power even in case of considerable wear of the friction facing 32.

The present invention is of course not limited to the embodiment described and illustrated herein but encompasses all modifications, alternatives and equivalents without departing from the spirit and scope of the invention.

In particular the functions of the stack of Belleville washers 40 and the actuating unit 39 may be reversed, the Belleville washers serving to keep the brake shoe out of contact with the brake disc and the actuating unit overcoming the force of the Belleville washers to apply the brake shoe against the brake disc.

What is claimed is:

1. A disc brake for industrial use of the type comprising, in association with a brake disc, a fixed support having a bore facing the brake disc with the axis of said bore being perpendicular to said brake disc, a brake shoe axially displaceable in said bore in a first direction relative to the brake disc in response to resilient control means bearing against said fixed support, and in a second direction opposite to the first direction in response to an actuating unit carried by said fixed support, the improvement comprising swivel contact means between said brake shoe and said fixed support, said swivel contact means comprising a contact surface formed on a selected one of said brake shoe and said fixed support for contact with the nonselected one of said brake shoe and said fixed support.

2. A disc brake for industrial use of the type comprising, in association with a brake disc, a fixed support having a bore facing the brake disc with the axis of said bore being perpendicular to said brake disc, a brake shoe axially displaceable in said bore in a first direction relative to the brake disc in response to resilient control means bearing against said fixed support, and in a second direction opposite to the first direction in response to an actuating unit carried by said fixed support, the improvement comprising swivel contact means between said brake shoe and said fixed support, said actuating unit comprising a fixed member and a movable member, said movable member being attached by a control rod to said brake shoe, said actuating unit being in simple axial bearing contact through said fixed member with said fixed support whereby said actuating unit is freely swivelly mounted about the axis of said bore in said fixed support.

3. The disc brake according to claim 2, wherein said contact surface is a toroidal surface.

4. The disc brake according to claim 3, wherein said toroidal contact surface is within said bore.

5. The disc brake according to claim 3, wherein said toroidal contact surface is on said brake shoe and in contact with the surface of said bore.

6. The disc brake according to claim 1, wherein said contact surface is on said brake shoe and in contact with the surface of said bore.

7. The disc brake according to claim 2, wherein other swivel contact means are provided between said actuating unit and said fixed support.

8. The disc brake according to claim 3, wherein said other swivel means comprise a toroidal contact surface formed on a selected one of said fixes support and said actuating unit in contact with the non selected one of the said fixed support and said actuating unit.

9. The disc brake according to claim 2 or 3, wherein said actuating unit comprises a hydraulic actuating unit, said control rod extending through said hydraulic actuating unit and fixed beyond said movable member to a transverse shoulder through which said control rod bears against said movable member, said hydraulic actuating unit comprising a fluidtight entity having a pressure chamber confined between its fixed member defining a cylinder and its movable member defining a piston.

10. The disc brake according to claim 9, wherein said control rod comprises two axial parts including a first or forward part attached to said brake shoe and a second or rear part on which said transverse shoulder is formed, wherein disengageable coupling means axially connect said forward and rear parts of said control rod thereby permitting easy dismounting of said actuating unit by rearward removal of said control rod.

11. The disc brake according to claim 10, wherein said control rod further comprises an inner and an outer element, said outer element including two parts and having said transverse shoulder by which said control rod bears against said movable member, said inner element being attached to said brake shoe and threadedly engaging said outer element, said inner element comprising two axial parts fixed for rotation with each other.

12. The brake according to claim 9, said fixed member and said movable member of said actuating unit each having cylindrical skirts in cylinder-and-piston relation with each other, wherein at least one of said members comprises an annular recess at the face of its skirt facing the edge of the skirt of the other of said member for accommodating the last-mentioned skirt therein.

13. The disc brake according to claim 9, wherein said movable member of said actuating unit comprises an externally threaded annular surface.

14. A disc brake for industrial use of the type comprising, in association with a brake disc, a fixed support having a bore facing the brake disc with its axis perpendicular thereto, a brake shoe axially displaceable in a first direction relative to the brake disc in response to resilient control means bearing against said fixed support, and in a second direction opposite to the first direction in response to an actuating unit carried by said fixed support, the improvement wherein said actuating unit comprises a fixed member and a movable member, said movable member being attached by a control rod to said brake shoe, said actuating unit being in simple axial bearing contact through said fixed member with said fixed support and swivel contact means being provided between said actuating unit and said fixed support enabling swivel movement of said actuating unit about the axis of said bore in said fixed support.

15. A disc brake for industrial use of the type comprising, in association with a brake disc, a fixed support having a bore facing the brake disc with its axis perpendicular thereto, a brake shoe axially displaceable in a first direction relative to the brake disc in response to resilient control means bearing against said fixed support, and in a second direction opposite to the first direction in response to an actuating unit carried by said fixed support, the improvement comprising first swivel contact means between said brake shoe and said fixed support and second swivel contact means between said actuating unit and said fixed support.

* * * * *